United States Patent [19]

Hauser

[11] 4,420,990

[45] Dec. 20, 1983

[54] TRANSMISSION FILLER

[75] Inventor: Hans Hauser, Chippewa Lake, Ohio

[73] Assignee: MTD Products Inc., Cleveland, Ohio

[21] Appl. No.: 307,810

[22] Filed: Oct. 2, 1981

[51] Int. Cl.³ .................... F16H 57/02; F16H 57/04
[52] U.S. Cl. .................... 74/606 R; 74/467; 184/6.12
[58] Field of Search .............. 74/467, 606 R; 264/46.6; 184/6.12; 206/814, 523, 524; 53/467

[56] References Cited

U.S. PATENT DOCUMENTS

| 1,274,433 | 0/1918 | Mix | 74/467 |
| 2,979,779 | 0/1961 | Staak | 264/46.6 |
| 4,274,298 | 6/1981 | Ostrander | 74/467 |

Primary Examiner—Lawrence J. Staab
Assistant Examiner—Michael D. Bednarek
Attorney, Agent, or Firm—Woodling, Krost and Rust

[57] ABSTRACT

A filler (18) for a transmission (10) is disclosed to occupy most of the space in a transmission (10) between the gears (A through G) and the housing (11), thus reducing the amount of lubricant necessary to lubricate the gears.

15 Claims, 5 Drawing Figures

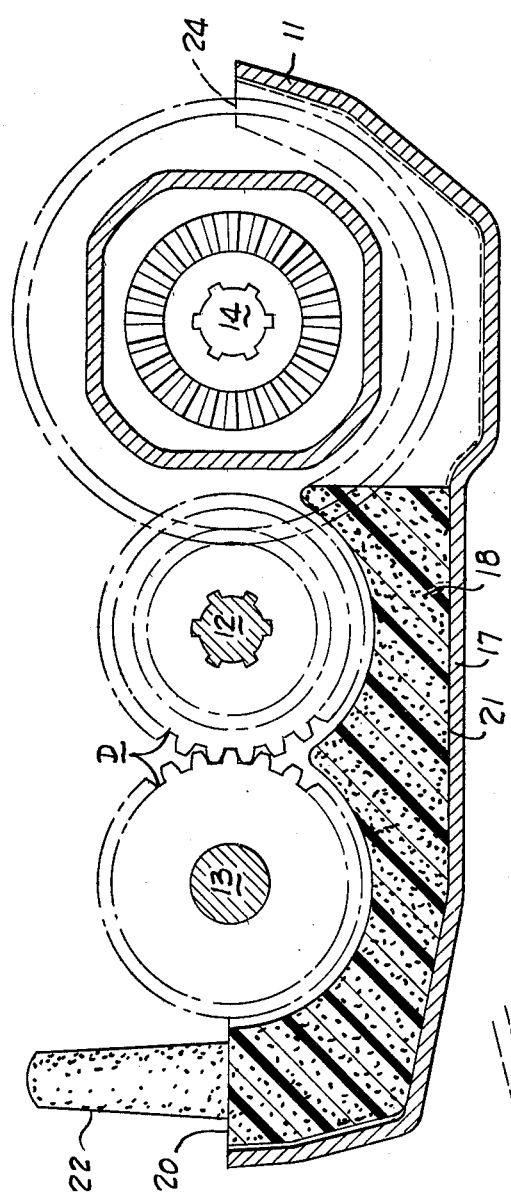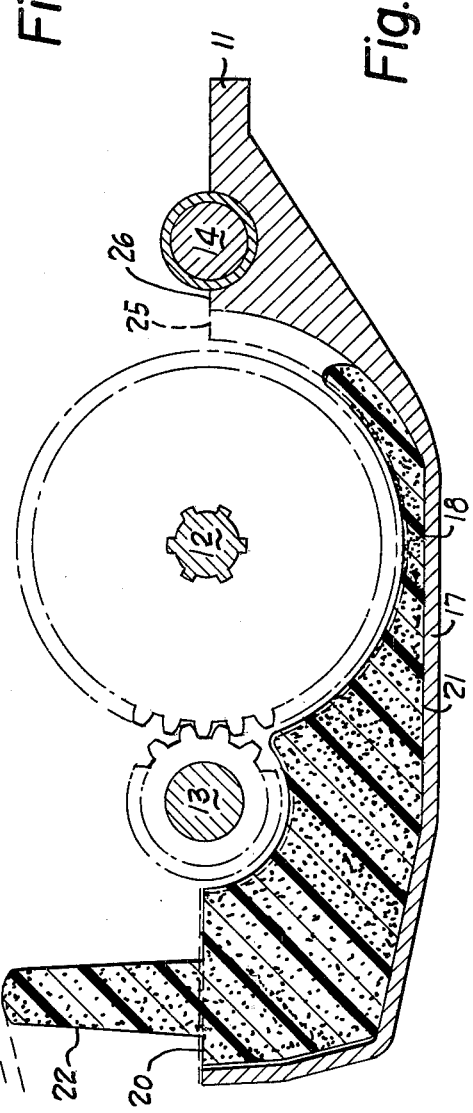

4,420,990

TRANSMISSION FILLER

FIELD TO WHICH INVENTION RELATES

My invention relates to a filler for physically occupying unutilized open space in a transmission and physically locating a lubricant against the moving parts of the transmission. It is especially suitable for the transmission of small lawn and garden tractors.

STATEMENT OF THE INVENTION

It is an object of this invention to reduce the amount of lubricant necessary to lubricate the gears without any effective loss of lubrication efficiency.

It is an object of this invention to locate and retain the lubricant where desirable and beneficial.

It is an object of this invention to improve the lubrication of the gears.

It is an object of this invention to reduce the cost of the housing of the transmission by allowing the housing to be made of simple geometric shapes.

It is an object of this invention to increase the usefulness of transmission housings.

It is an object of this invention to reduce the cost of assemblying a transmission.

Other advantages and a fuller understanding of the invention may be had by referring to the following description and claims, taken in conjunction with the accompanying drawings in which:

FIG. 4 is a transverse cutaway side view of the transmission and filler of FIG. 1 taken generally along lines 4—4 of that figure; and FIG. 5 is a transverse cutaway side view of the transmission and filler of FIG. 1 taken generally along lines 5—5 of that figure.

DESCRIPTION OF THE INVENTION HEREIN DISCLOSED

Figure 1:
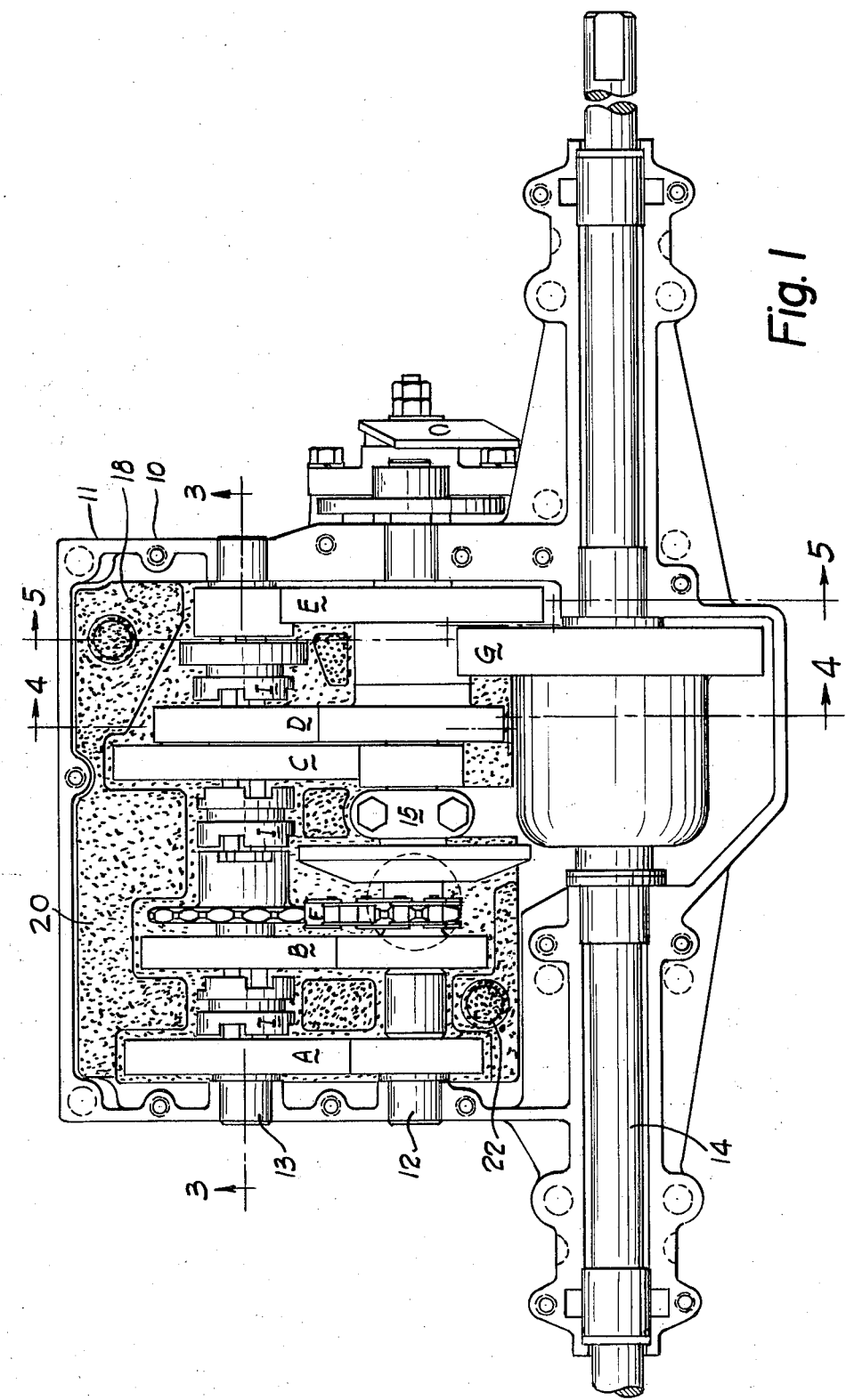
FIG. 1 is a top view of a partially disassembled transmission disclosing a filler in place.

This invention relates to a filler for a transmission. In the example disclosed the transmission is a six-speed transaxle 10 having a housing 11, two transmission shafts 12, 13 and a differential shaft 14. See FIG. 1. The transmission shaft 12 has a mid support 15. There are a number of pairs of intermeshing gears A, B and C and a chain reverse F between the transmission shafts 12 and 13. There are intermeshing gears D, E and G between one transmission shaft 13 and the differential shaft 14. dog clutches I engage the gears to their respective shaft 13.

The transaxle transmission shown has, as do most transmissions, a significant open space between the bottom 17 of the housing 11 and the lower portions of the gears A through G. See FIG. 3. A good measure of this open space is due to the economics of making the housing 11. The shape of the die is an important consideration. A housing 11 with a simple geometric shape is cheaper to make than one with complex contours. A simple geometric shape enhances the die casting procedure. Simple dies last longer.

A grease lubricant is used for lubricating the gears in this transmission in order to reduce the cost of transmission seals. In order to lubricate the gears, A through G, and the other moving parts of the transmission, it is necessary to place this lubricant adjacent to and in contact with them. This normally means filling the entire significant open space between the bottom 17 and sides of the housing 11 and the gears A through G with lubricant. Due to the large amount of lubricant needed, this is expensive and inefficient. The filling of the open space with lubricant is expensive not only for the basic price of the lubricant but also for the assembly time lost in filling the housing 11 with the lubricant. The filling of the open space with lubricant is inefficient in that there is no physical advantage to most of the lubricant so used. The lubricant located away from the gears is unavailable to the gears; the lubricant does not normally migrate within a transmission. Indeed, it is normal upon disassembly of an old transmission to discover virtually virgin lubricant in places other than immediately next to the moving parts of the transmission.

The invention of this application is that a filler 18 between the housing 11 and the moving parts of the transmission 10 effectively reduces the open space between them and consequently the amount of lubricant necessary to lubricate the moving parts. The filler 18 locates the lubricant that is used where such lubricant is of most benefit.

Figure 2:
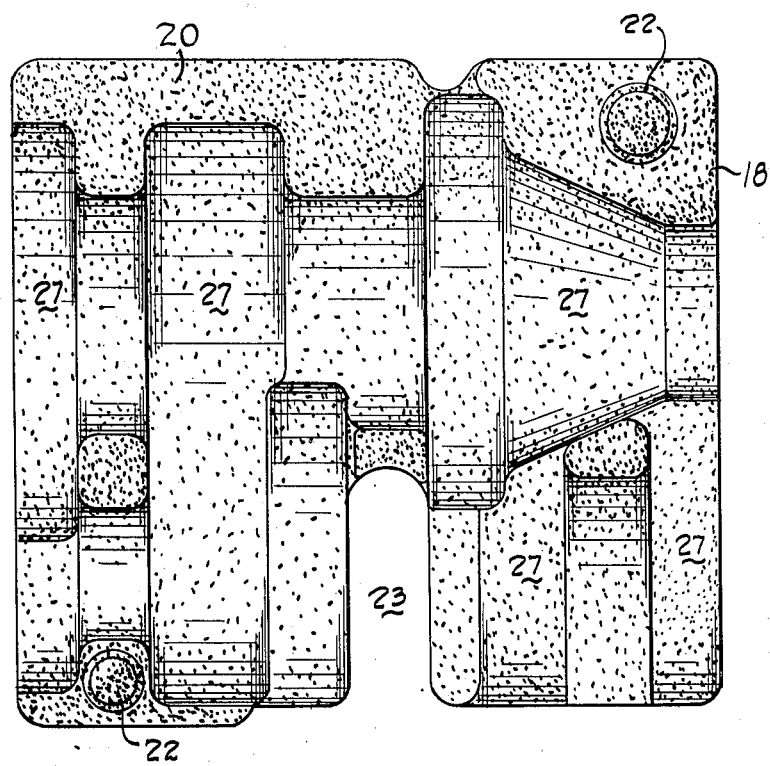
FIG. 2 is a top view of the filler of FIG. 1 removed from the housing.

In the embodiment disclosed in this application the filler 18 has a body 19 with a top surface 20 and a bottom surface 21. The filler preferably is of an easily moldable foam material such as polystyrene sometimes sold under the trademark "Styrofoam" or any other suitable inert plastic material. The material should have closed cells so as to not absorb the lubricant. The material should be impervious to the lubricant. The filler 18 is located intermediate between the sidewalls and the bottom 17 of the housing 11 and the shafts 12, 13 and the gears A through G of the transmission 10. See FIGS. 3, 4 and 5. The top surface 20 of the filler 18 has a contour (see FIG. 2) surrounding the lower portions of these moving parts a spaced distance therefrom. The bottom surface 21 of the filler 18 engages the bottom 17 of the housing 11. The filler 18 has small legs 22 extending from its top surface 20 to engage the top (not shown) of the housing 11 and hold the filler 18 in place. A small notch 23 allows clearance for the shaft support 15.

In the embodiment disclosed the filler 18 does not occupy any space near the differential shaft 14. This is because the differential shaft, being a relatively low speed structure, does not require the quality or quantity of lubrication as the other moving parts. Incidental lubrication is sufficient. In the prior art, the differential shaft 14 is not given vast quantities of lubrication. If it was deemed advisable, the filler 18 could easily be extended to underlie the differential shaft 14 such as shown in dotted lines 24 in FIG. 4.

Although it is preferred that the filler 18 have a body 19 to physically occupy most of the open space within the transmission, for in the event of a piece coming off one part of the filler 18 the remainder of the filler 18 would not be compromised, it is not necessary that the filler 18 do so. It is possible for a filler 18 to be designed essentially as a top surface 20 skin alone—see dotted lines 25 in FIG. 5. This skin should be formed of a material capable of self sustaining its shape. An oil resistant thermoplastic is preferred. The skin 25 would be supported by its outer edges 26, as well as any contacts elsewhere. The contours of the top surface 20 would strengthen the skin 25 against flexing. Strengthening ribs and support legs could be designed in as needed.

In addition to reducing the open space between the moving parts of a transmission and the transmission housing 11, and thus the amount of lubricant used, the filler 18 also can be used to increase the usefulness of a transmission housing. By using different fillers, depending on the particular gear assembly combination being built, one housing can be used for many gear combinations without large voids. The proper use of a filler would allow for many adaptations of a single housing to be built—each effectively custom designed. For example, the transaxle disclosed in this application is a six speed unit. If the gears E and the two range clutch next to them were omitted, the transaxle would be a three speed unit. There would also be a large quantity of open space where these gears E and clutch were. This open space is inefficient. By having a different filler made, the new filler occupying this open space, the three speed transaxle would have an effectively custom designed housing surrounding it, at a loss of only a slight loss of packaging efficiency.

Due to the nature of transmissions and lubrication the use of a filler normally would not be economically justified on the top half of a transmission. One could, however, be used.

Figure 3:
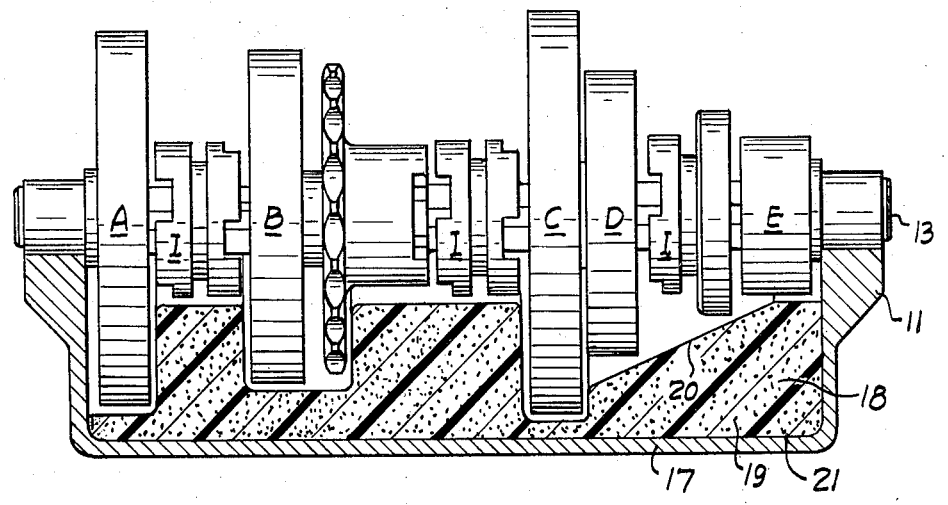
FIG. 3 is a longitudinal cutaway side view of the transmission and filler of FIG. 1 taken generally along lines 3—3 of that figure.

The filler 18 is molded in a separate operation. It is molded on a form (not shown) generally following the contours of the open space to be filled. The form need not strictly duplicate in detail the contours of the open space to be filled. Instead the form is also chosen for strength and uniformity of the filler and ease of molding. This means some compromise on the amount of lubrication to be used. As an example of this, note that the filler 18 beneath gears D and E in FIG. 3 is slanted and that the shape of the filler 18 disclosed does not occupy all the open space that it physically could be made to occupy.

After the filler 18 has been molded, it is sent to the assembly line for inclusion in a transmission.

The filler 18 can be included into a transmission as is.

The filler 18 can also be included already containing a pre-measured amount of lubrication for the transmission. For this to occur measured amounts of lubrication would be placed at various pre-selected locations 27 within the contours of the top surface 20 of the filler 18, see FIG. 2, while the filler 18 was still a separate piece. The lubrication amounts and positions would be chosen to provide the desired quality of. The lubricated filler 18 would then be included in the assembly of the transmission—speeding assembly by removing the separate transmission lubrication step. This pre-lubrication would also increase the efficiency of the lubrication by precisely locating it in respect to the moving parts of the transmission. The lubricant would be located where it would be most beneficial.

The filler 18 enhances the lubrication of the transmission 10 by originally positioning the lubricant in respect to the moving parts of the transmission 10. The filler 18 further enhances the lubrication of the transmission 10 by causing the lubricant to remain near to the moving parts of the transmission 10. The positioned and retained lubricant does not flow, slump or be pumped into non-active spaces in respect to the moving parts. The volume of lubricant is reduced by the filler—not the effectiveness of the lubricant.

The filler 18 has reduced the quantity of lubrication needed and located the lubrication used adjacent the gears within the transmission housing.

Although this invention has been described in its preferred form with a certain degree of particularity, it is to be understood that numerous changes may be made without departing from the invention as hereinafter claimed.

What is claimed is:

1. A filler for a transmission having a lower half of a housing and at least one pair of intermeshing gears within the housing spaced from the inner walls of the housing, the housing being adapted to contain a mass of lubricant for lubricating said gears, the gears having lower portions, said filler comprising a body in fixed form of nonlubricating material, said body being positioned between the housing and the gears, said body having a top surface and another part, said top surface of said body having cavities to contain the lower portions of the gears and said other part of said body engaging the lower half of the housing, said body occupying a major portion of the open space between the gears and the lower half of the housing and thus reducing the amount of lubricant within the housing necessary to lubricate the gears.

2. A filler for a transmission having a lower half of a housing and at least one pair of intermeshing gears spaced from the housing, the housing being adapted to contain lubricant for lubricating said gears, the gears having lower portions with contours, said filler comprising a body in fixed form of a material having low lubricating quality relative to said lubricant, said body being positioned between the housing and the gears, said body having a top surface and a bottom surface, said top surface of said body having cavities formed to contain the lower portions of the gears, said cavities generally following the contours of the lower portions of the gears a spaced distance therefrom to clear the gears and said bottom surface of said body engaging the lower half of the housing, said body occupying a major portion of the open space between the lower portions of the gears and the lower half of the housing and thus reducing the amount of lubricant necessary to lubricate the gears.

3. A filler of claim 2 characterized in that said filler is molded of a closed cell material.

4. A filler of claim 2 characterized in that said filler is composed of an inert plastic material contoured to accommodate the inner walls of the housing and parts within the lower portion of the housing.

5. A filler of claim 4 characterized in that said filler is molded of polystyrene.

6. In a transmission housing adapted to contain moving parts of the transmission and a mass of lubricant to lubricate the moving parts, the housing having an open space therein about the said moving parts, the improvement of a filler positioned in said open space at a distance from said moving parts to clear the same during movement and occupying space otherwise occupiable by the lubricant in the housing, said filler being comprised of foam material of closed cell structure molded in self sustaining form, said filler having low lubricating characteristic relative to said lubricant, the filler being disposed to maintain the lubricant in said open space not occupied by the filler into lubricating proximity with said moving parts.

7. The improvement claimed in claim 6 and in which said filler is comprised of molded foamed polystyrene of relatively closed cell structure and inert to lubricant in the housing.

8. The improvement claimed in claim 6 and in which the filler displaces lubricant which otherwise could occupy the open space about the moving parts generally to limit the lubricant to open space adjacent the moving parts to lubricate the moving parts.

9. In a gear housing having an open space within the housing about the gearing located in the housing and containing a mass of lubricant for lubricating the gearing, the improvement of a filler body relatively impervious to the lubricant and comprised of a material of low lubricating characteristic relative to the said lubricant, said body being disposed in said housing within the open space therein at a distance from said moving parts to clear the same during movement and displacing lubricant otherwise occupiable in some of the open space to induce the said lubricant to occupy other open space within the housing including open space adjacent the gearing for lubricating the gearing.

10. The improvement claimed in claim 9 and in which the said filler body is made of molded foamed polystyrene or like inert material having a closed cell structure.

11. The improvement claimed in claim 9 and in which said filler body is formed with cavities adapted to hold lubricant in lubricating proximity to said gearing.

12. The improvement claimed in claim 9 and in which the filler body is foamed polystyrene having low lubricating qualities and disposed in the open space in the housing to localize the lubricant outwardly of the filler and in lubricating proximity to said gearing.

13. A filler for a transmission having a lower half of a housing adapted to contain lubricant and at least one pair of intermeshing gears within the housing spaced from the inner walls of the housing, the gears having lower portions, said filler comprising a body in fixed form, said body being positioned between the housing and the gears, said body having a top surface and another part, said top surface of said body being impermeable to lubricant, said top surface of said body having cavities to contain the lower portions of the gears and said other part of said body engaging the lower half of the housing, said body occupying most of the open space between the gears and the lower half of the housing and thus reducing the amount of lubricant within the housing necessary to lubricate the gears.

14. A filler for a transmission having a lower half of a housing adapted to contain lubricant and at least one pair of intermeshing gears spaced from the housing, the gears having lower portions with contours, said filler comprising a body in fixed form of lubricant impermeable material, said body being positioned between the housing and the gears, said body having a top surface and a bottom surface, said top surface of said body having cavities formed to contain the lower portions of the gears, said cavities generally following the contours of the lower portions of the gears a spaced distance therefrom to clear the gears and said bottom surface of said body engaging the lower half of the housing, said body occupying a relatively large amount of the open space between the lower portions of the gears and the lower half of the housing and thus reducing the amount of lubricant necessary to lubricate the gears.

15. In a transmission having a lower half of a housing, at least one pair of intermeshing gears spaced from the housing, the gears having contoured lower portions and adapted to contain a lubricant for lubricating the gears, the improvement of a filler, said filler comprising a body molded in fixed self-sustaining form having a closed cell structure, said body being relatively impermeable to lubricant, said body being positioned between the inner wall of the lower portion of the housing and the said lower portions of the gears, said body having a top surface and a bottom surface, said top surface of said body having cavities formed to generally accommodate the lower portions of the gears, the walls of said cavities of the body generally corresponding to the walls of the contours of the said lower portions of the gears a spaced distance therefrom to assure clearance for movement of the gears, said bottom surface of said body facing the inner wall of the lower half of the housing, said body occupying a substantial amount of the otherwise open space between the lower portions of the gears and the inner wall of said lower half of the housing to reduce the amount of lubricant otherwise necessary to be positioned in lubricating proximity to the gears for lubricating the gears.

* * * * *